(12) United States Patent
LaRose

(10) Patent No.: US 8,056,329 B2
(45) Date of Patent: Nov. 15, 2011

(54) TRACTOR TRAILER POWER SYSTEM

(75) Inventor: Gary L. LaRose, Orlando, FL (US)

(73) Assignee: Gary LaRose LLC., Orlando, FL (US)

( * ) Notice: Subject to any disclaimer, the term of this patent is extended or adjusted under 35 U.S.C. 154(b) by 848 days.

(21) Appl. No.: 12/152,922

(22) Filed: May 20, 2008

(65) Prior Publication Data

US 2009/0288419 A1 Nov. 26, 2009

(51) Int. Cl.
F16D 31/02 (2006.01)
F02B 63/04 (2006.01)
(52) U.S. Cl. .......................... 60/325; 290/1 A
(58) Field of Classification Search .................. 60/325, 60/414; 180/53.1, 53.4, 53.5, 53.8; 290/1 R, 290/1 A; 414/545, 546
See application file for complete search history.

(56) References Cited

U.S. PATENT DOCUMENTS

| 4,448,157 | A | | 5/1984 | Eckstein et al. |
| 4,682,649 | A | | 7/1987 | Greer |
| 4,762,170 | A | | 8/1988 | Nijjar et al. |
| 5,333,678 | A | | 8/1994 | Melum et al. |
| 5,528,901 | A | | 6/1996 | Willis |
| 5,829,947 | A | * | 11/1998 | Litten ........................... 414/546 |
| 6,102,646 | A | * | 8/2000 | Bass et al. ..................... 414/537 |
| 7,245,033 | B2 | | 7/2007 | Wurtele |
| 2002/0056993 | A1 | | 5/2002 | Kennedy |
| 2003/0070849 | A1 | | 4/2003 | Whittaker |
| 2003/0141049 | A1 | * | 7/2003 | Kennedy ........................... 290/2 |
| 2007/0224843 | A1 | * | 9/2007 | Kim et al. ....................... 439/35 |

* cited by examiner

Primary Examiner — Michael Leslie
(74) Attorney, Agent, or Firm — William M. Hobby, III

(57) ABSTRACT

The present invention relates to a tractor trailer power system for powering a hydraulic liftgate and other components in the trailer so the tractor engine does not have to run to maintain the battery charge of the trailer batteries.

6 Claims, 1 Drawing Sheet

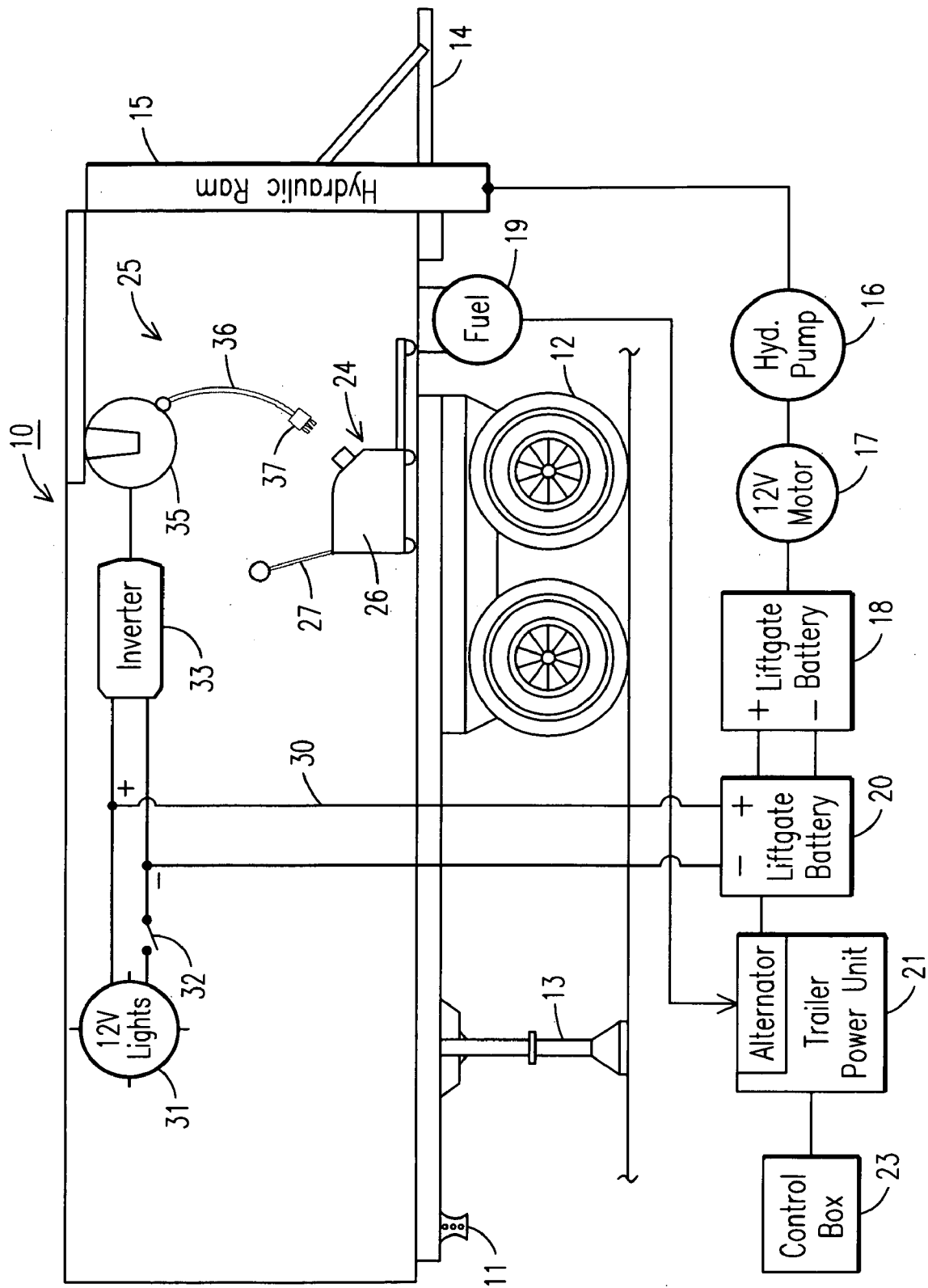

TRACTOR TRAILER POWER SYSTEM

BACKGROUND OF THE INVENTION

This invention relates to a tractor trailer power system and especially to a trailer power system which is independent from the tractor and main engine for operating the trailer liftgate and other power components to prevent tractor idling.

Auxiliary power units are commonly provided for auxiliary cooling, heating and power to trucks having semi-trailers and they are especially common with cross-country truckers. Trucks used for long hauls are generally equipped with a sleeper compartment located in a truck cab to provide a convenient place for a trucker to sleep. The truck has a main engine which typically has a heating system including a heater in the cab of the truck as well as an air-conditioning system for the truck cab. However, when the trucker parks a truck to rest or sleep, the heater or air-conditioning in the sleeper requires the continuous running of the truck's engine. It is inefficient to run the truck's engine to merely provide heating and air-conditioning and is more efficient to use auxiliary power units which usually have a small auxiliary engine to provide power for heating or cooling.

Large tractor trailer trucks have large trailers connected to a fifth wheel of the truck and commonly have a liftgate which is hydraulically operated for loading and unloading the truck. Truck trailers of this type also frequently carry a pallet mover for moving heavy loaded pallets into and out of the trailer. These pallet movers are electrically powered through batteries which are typically re-charged from a 110 volt AC source.

The trailer hydraulic liftgates are driven by hydraulic fluid powered by an electric motor driven hydraulic pump which in turn is powered by liftgate batteries. The liftgate batteries are charged from the main engine of the truck. When a trailer is disconnected from the truck or tractor and left in place without the truck, there is no truck engine to power the alternator for recharging the liftgate batteries. The trailer then generally sits idle until the tractor returns so that the liftgate can be operated and the truck unloaded or loaded. This can provide for a great deal of lost time in the loading and unloading the trailer. Currently, tractors must have their engines running to charge the trailer batteries.

The present invention is directed towards an auxiliary power source which can continuous recharge the liftgate batteries so the tractor engine can be turned off. The present auxiliary power source can also provide a handy power reeled cable for attaching to the pallet lifters and movers so that the trailer can be fully operational for loading and unloading without the truck engine running.

In the past, there have been numerous auxiliary power systems for trucks including U.S. Pat. No. 5,333,678 to Mellum et al. for an auxiliary power unit for a truck having a cab and a sleeper to provide auxiliary power for auxiliary air conditioning and heating without having to keep the main truck engine running. In the Kennedy U.S. patent application Publication No. 2002/0056993 an integrated conventional air conditioning system for trucks has an auxiliary power source to drive the compressor when the main engine is not operated. In the Gear U.S. Pat. No. 4,682,649 an auxiliary air conditioning, heating and engine warming system for trucks includes a small lightweight auxiliary power plant which includes an engine, an electrical alternator, water pump, air conditioning compressor, and heat exchanger mounted on the tractor or truck for providing auxiliary power for the electrical system when the truck engine is not running. In the Willis U.S. Pat. No. 5,528,901 a compact auxiliary power system for heavy duty diesel engines and methods is provided while the Whittaker U.S. patent application Publication No. 2003/0070849 provides an auxiliary power unit for vehicles. The Wurtele U.S. Pat. No. 7,245,033 is an auxiliary heating and air conditioning unit for diesel powered transport vehicles while the Nijjar et al. U.S. Pat. No. 4,762,170 is an auxiliary power system for trucks and other heavy duty vehicles. The Eckstein et al. U.S. Pat. No. 4,448,157 is an auxiliary power unit for vehicles.

These prior art auxiliary power units are typically mounted on the truck for providing power to the truck for driving the heating and air conditioning systems without leaving the truck's main engine running. Auxiliary power units have also been utilized in emergency vehicles for providing emergency power. Typically, these vehicles obtain their power from the main engine of the vehicle. Currently, the main engine needs to be idling to keep the auxiliary batteries charged.

The present invention on the other hand is directed towards a separate auxiliary power supply for the tractor trailer to keep the trailer operational for loading and unloading when the truck is disconnected from the trailer. It also prevents idling the tractor engine which typically consumes one gallon per hour while the auxiliary power unit consumes 0.1 gallon per hour and only runs when the batteries are low and shuts off when they are charged.

SUMMARY OF THE INVENTION

The present invention relates to a tractor trailer power system for powering a hydraulic liftgate and other components of a trailer independent of the tractor engine even when the trailer is disconnected from the tractor. The tractor trailer has a hydraulic liftgate actuated by an electric motor driven pump powered by a liftgate battery pack. The auxiliary power generator is mounted to the trailer for generating electric power for the trailer to prevent the tractor engine idling and even when the tractor is disconnected from the trailer. It is connected to the trailer liftgate battery pack for charging the battery pack. An auxiliary trailer fuel tank is attached to the trailer operatively connected to the auxiliary power generator engine for supplying fuel thereto. An electric converter is mounted to the trailer for converting a battery pack DC voltage to an AC voltage and is connected to a reeled electrical cord having an electrical connector on one end being mounted to the trailer. The electrical cord is connected to the inverter for supplying an AC voltage inside the trailer. Thus the trailer has power for the trailer liftgate and for pallet equipment in the trailer when disconnected from the tractor. The auxiliary power generator may be a diesel engine driven alternator and the trailer may have electric lights located inside powered by the liftgate battery pack. The trailer may have a pallet lifter or mover positioned therein powered by the liftgate batteries through the electric inverter when the pallet mover is connected through the reeled electric cord. The electric motor driven pump has a 12 volt electric motor.

BRIEF DESCRIPTION OF THE DRAWINGS

Other objects, features, and advantages of the present invention will be apparent from the written description and the drawing in which:

The FIGURE is a schematic diagram of a tractor trailer power system in accordance with the present invention.

DETAILED DESCRIPTION OF THE PREFERRED EMBODIMENT

Referring to the drawing of a tractor trailer 10 is illustrated in diagrammatic form and includes a king pin 11 for connection to the fifth wheel of a truck. A trailer 10 has wheels 12 and support legs 13 for supporting the trailer when not connected to the tractor. The tractor trailer has a liftgate 14 which is raised and lowered with a hydraulic ram 15. The trailer also carries an auxiliary fuel tank 16. The trailer liftgate 14 is raised and lowered by the hydraulic ram 15 which is driven by a hydraulic pump 16 which is run by a 12 volt electric motor 17. The electric motor 17 is powered by a liftgate battery source 18 and 20. This is a typical liftgate operational system in which the batteries 18 and 20 are charged by the tractor's main engine.

In the present system, an auxiliary power unit 21 is mounted to the trailer 10 and has a diesel or gasoline engine driving an alternator 22 which can charge the liftgate batteries 18 and 20 so that the tractor does not have to run to keep the liftgate batteries charged. A control box 23 allows the power unit 21 to be controlled by starting the diesel engine placed in the trailer power unit 21 for driving the alternator. The control box 23 consists of an on-off switch, a relay driver, voltage monitor, start warning buzzer, hour meter, start relay, run relay, and shutdown relay. The voltage monitor senses when the batteries need to be charged by sensing the battery voltage. The relay driver starts a sequence to energize the start warning buzzer, crank the alternator engine, and turn on the fuel solenoid. The alternator engine powers an alternator to charge the batteries. When the batteries are charged, the voltage monitor shuts the engine off. This sequence is repeated as needed to maintain the batteries for the trailer charged at all times.

The trailer 10 can operate the hydraulic ram 15 and liftgate 14 when the trailer is not connected to the tractor. It is common for the tractor to be removed from the trailer and supported on legs 13 while the tractor is driven off. The tractor must be kept running at idle to keep the batteries charged during loading and unloading of the trailer. Also, the loading and unloading of the trailer 10 is stopped until the return of the tractor for connecting the power source to the trailer 10.

A pallet lifter and mover 24 is commonly placed within the inside 25 of a trailer and includes a battery source and electric motor located in a housing 26 with a protruding hand control 27 and a pallet lifting surface 28. The batteries in the pallet mover 24 need to be recharged on a regular basis in order for the pallet mover to operate and, in this connection, electric lines 30 are connected from the liftgate batteries 20 into the interior 25 of the trailer 10. These batteries operate electric lights 31 within the trailer 10 which can be operated by a switch 32.

The power lines 30 entering the trailer 10 also connect to a power inverter 33 which converts a 12 volt DC to 110 volts AC power. The line 30 feeds into an output line 34 and through a reel 35 to allow for a hanging electric cord 36 with an electric plug 37. This arrangement allows the electric plug 37 to be pulled down with the electric cord 36 extending from the reel 35 to plug into the pallet mover 24 for operating the pallet mover or for recharging the batteries in the pallet mover.

The auxiliary power unit of the present invention allows the trailer 10 to be parked with the tractor engine off or removed and to be fully operational for loading or unloading the trailer for providing the interior lights 31 power for the pallet mover while simultaneously recharging the liftgate batteries for operating the hydraulic liftgate 14 utilizing its own fuel source from a separate fuel tank 16. The auxiliary power unit engine uses a small fraction of the fuel needed to idle the tractor engine.

The auxiliary power unit 21 would normally be a diesel power unit that would be receiving diesel fuel from the fuel tank 16. The fuel tank 16 could advantageously be utilized also for providing fuel to a trailer refrigeration unit for hauling refrigerated goods.

It should be clear at this time that a tractor trailer power system has been provided for allowing the trailer to be loaded and unloaded without the tractor engine running or when disconnected from the tractor. The system can be easily attached to existing trailers. However, the present invention is not to be construed as limited to the forms shown which are to be considered illustrative rather than restrictive.

I claim:

1. A tractor trailer power system comprising:
    a trailer having a hydraulic liftgate actuated by an electric motor driven pump powered by a liftgate battery pack;
    an auxiliary power generator mounted to said trailer for generating electric power for said trailer and being connected to said trailer liftgate battery pack for charging said battery pack;
    a trailer fuel tank attached to said trailer and operatively connected to said auxiliary power generator for supplying fuel thereto;
    an electric inverter mounted to said trailer for converting said battery pack DC voltage to an AC voltage; and
    a reeled electrical cord having an electrical connector on one end and being mounted in said trailer; said electrical cord connected to said inverter for supplying an AC voltage inside said trailer with or without the tractor;
    whereby a tractor trailer has power for the trailer liftgate and for pallet equipment and lights in the trailer independent of the tractor.

2. The tractor trailer power system in accordance with claim 1 in which said auxiliary power generator is a diesel engine driven alternator.

3. The tractor trailer power system in accordance with claim 2 in which said liftgate battery pack is connected to a trailer electric light located inside said trailer for lighting the inside of said trailer.

4. The tractor trailer power system in accordance with claim 3 in which said trailer has a pallet mover positioned therein powered by said liftgate batteries through said electric inverter when said pallet mover is connected through said reeled electric cord.

5. The tractor trailer power system in accordance with claim 4 in which said electric motor driven pump has a 12 volt electric motor.

6. The tractor trailer power system in accordance with claim 5 in which said auxiliary power generator has a control box for controlling said motor.

* * * * *